(12) United States Patent
Brand et al.

(10) Patent No.: US 11,602,030 B2
(45) Date of Patent: Mar. 7, 2023

(54) LUMINAIRE WITH POWER FAILURE DETECTION

(71) Applicant: Schreder S.A., Brussels (BE)

(72) Inventors: Daniel Brand, Wedemark (DE); Laurent Secretin, Rémicourt (BE); Raoul Van Bergen, Bornheim (DE)

(73) Assignee: Schreder S.A., Brussels (BE)

( * ) Notice: Subject to any disclaimer, the term of this patent is extended or adjusted under 35 U.S.C. 154(b) by 83 days.

(21) Appl. No.: 15/733,609

(22) PCT Filed: Mar. 18, 2019

(86) PCT No.: PCT/EP2019/056722
§ 371 (c)(1),
(2) Date: Sep. 15, 2020

(87) PCT Pub. No.: WO2019/175438
PCT Pub. Date: Sep. 19, 2019

(65) Prior Publication Data
US 2021/0044143 A1 Feb. 11, 2021

(30) Foreign Application Priority Data

Mar. 16, 2018 (BE) .................................. 2018/5178

(51) Int. Cl.
*H05B 45/50* (2022.01)
*H05B 47/11* (2020.01)
(Continued)

(52) U.S. Cl.
CPC ......... *H05B 45/50* (2020.01); *F21V 23/0457* (2013.01); *G06F 1/30* (2013.01);
(Continued)

(58) Field of Classification Search
CPC ........ H05B 45/50; H05B 47/11; H05B 47/18; H05B 47/185; H05B 47/20; H05B 45/37;
(Continued)

(56) References Cited

U.S. PATENT DOCUMENTS

| 9,674,916 B2 | 6/2017 | Hashimoto |
| 2011/0109164 A1 | 5/2011 | Mohammed Suhura et al. |

(Continued)

FOREIGN PATENT DOCUMENTS

| CN | 107770914 A | 3/2018 |
| GB | 2176640 A | 12/1986 |

(Continued)

OTHER PUBLICATIONS

PCT International Search Report and Written Opinion, PCT International Application No. PCT/EP2019/056722, dated Apr. 18, 2019.

*Primary Examiner* — Lincoln D Donovan
*Assistant Examiner* — Alex W Lam
(74) *Attorney, Agent, or Firm* — McDonnell Boehnen Hulbert & Berghoff LLP (57) ABSTRACT

The invention relates to a luminaire with a light source comprising: a functional unit; a power supply and control unit configured for converting power from a main power source into a power signal for powering the functional unit; wherein the power supply and control unit is configured to generate a power supply failure signal when the power supply from the main power source fails and to communicate the power supply failure signal to the functional unit.

20 Claims, 3 Drawing Sheets

(51) Int. Cl.
*H02J 9/06* (2006.01)
*H05B 47/185* (2020.01)
*H05B 47/18* (2020.01)
*F21V 23/04* (2006.01)
*G06F 1/30* (2006.01)
*F21W 131/103* (2006.01)

(52) U.S. Cl.
CPC .............. *H02J 9/065* (2013.01); *H05B 47/11* (2020.01); *H05B 47/18* (2020.01); *H05B 47/185* (2020.01); *F21W 2131/103* (2013.01)

(58) Field of Classification Search
CPC ... H05B 47/105; H05B 47/19; F21V 23/0457; F21V 23/003; F21V 23/023; F21V 3/00; G06F 1/30; H02J 9/065; F21W 2131/103; Y02B 20/40; F21K 9/23; F21Y 2115/10; F21S 9/022
See application file for complete search history.

(56) References Cited

U.S. PATENT DOCUMENTS

| | | | | |
|---|---|---|---|---|
| 2011/0163668 | A1* | 7/2011 | Jonsson | ................. H05B 47/19 |
| | | | | 315/129 |
| 2013/0040471 | A1* | 2/2013 | Gervais | ................. H05B 47/11 |
| | | | | 439/56 |

FOREIGN PATENT DOCUMENTS

| | | | | | |
|---|---|---|---|---|---|
| WO | | 2015028067 | A1 | 3/2015 | |
| WO | WO-2015028067 | A1 | * | 3/2015 | .............. F21S 8/086 |
| WO | | 2016124917 | A1 | 8/2016 | |
| WO | WO-2016124917 | A1 | * | 8/2016 | .......... H02J 13/0079 |

\* cited by examiner

Fig. 5

# LUMINAIRE WITH POWER FAILURE DETECTION

CROSS-REFERENCE TO RELATED APPLICATION

The present application is a national stage entry of PCT/EP2019/056722 filed on Mar. 18, 2019, which claims priority to BE 20185178, filed on Mar. 16, 2018, the contents of each of which are hereby incorporated by reference.

FIELD OF INVENTION

The field of invention relates to luminaires, in particular outdoor luminaires such as outdoor luminaires for streetlights, and more in particular luminaires capable of communicating with other devices.

BACKGROUND

WO 2015/028067 in the name of the Applicant describes a luminaire with a luminaire controller mounted within a luminaire head. The luminaire controller comprises a light sensor for providing a signal relating to ambient light levels, and a light guide having a light inlet through which ambient light can be received and a light outlet through which light is directed to the light sensor. Further, the luminaire is provided with an antenna provided on an upper surface of the luminaire head. The luminaire controller is provided with a communication unit for communicating with the communication network. The signals from the light sensor may be passed to other controllers of other luminaires and used for controlling a group of luminaires.

Other existing luminaires use plug twist-lock control modules containing different control blocks and/or sensors, e.g. a light sensor for sensing the light level of ambient light to automatically control the light sources of the lighting equipment. Electrical receptacles for receiving such control modules are typically mounted on the top of a housing. The receptacle has a connection interface located on an external side of the housing, so that an external control module can be plugged into the receptacle to provide control for the lighting equipment. Preferably, the receptacle and the control module fulfil the requirements of the ANSI C136.41-2013 standard.

Such luminaires may lose data or may be damaged when faced with a power failure of the mains, unless complicated measures are taken.

SUMMARY

The object of embodiments of the invention is to provide a luminaire capable of dealing with a power failure of a main power source in a simple and robust manner.

According to a first aspect, there is provided a luminaire with a light source, said luminaire comprising: a functional unit and a power supply and control unit configured for converting power from a main power source into a power signal for powering the functional unit. The power supply and control unit is configured to generate a power supply failure signal when the power supply from the main power source fails and to communicate the power supply failure signal to the functional unit.

In that manner, the functional unit can be informed about a power failure of the main source before the power provided to the functional unit fades away. Indeed, because the power supply and control unit is configured for converting power from a main power source into a power signal for powering the functional unit, there will always be some energy stored in the power supply and control unit, and the power provision to the functional unit will be cut only after a certain delay period. However, the detection of the power failure of the main source can be fast, and the power supply failure signal can be generated and communicated before the power provided to the functional unit fades away, so that the functional unit can take appropriate action(s) before it is no longer provided with power. In that manner, it can be avoided that a functional unit is being hindered significantly by a power shut-off of the main source, e.g. it can be avoided that a functional unit is damaged or that data is lost, etc.

According to an embodiment, the power supply and control unit is provided with an energy storage capacity which is such that power is provided to the functional unit during a predetermined period of time after the power supply from the main power source has stopped. Optionally, the energy storage capacity may also provide power to the power supply and control unit during a predetermined period of time, and more in particular to any control circuitry included therein. Typically, the power conversion circuitry of the power supply and control unit comprises capacitors and/or inductors and will automatically result in a delay, and hence in a gradual fading away of the provision of power to the functional unit. However, the time period may be extended by adding an energy storage capacity, as described more in detail below. The time period may be of the order of milliseconds, typically at least 10 ms, and e.g. between 10 ms and 10 s, preferably of the order of seconds, typically at least 10 s. More preferably, it will be at least 30 s, even more preferably at least 60 s, typically at least 300 s.

According to an embodiment, the power supply and control unit is connected to the functional unit through a connection assembly comprising at least two power supply lines and a power failure communication line for transferring the power supply failure signal. In an alternative embodiment, there may only be provided at least two power supply lines, and the power supply and control unit may be configured to communicate the power supply failure signal wirelessly to the functional unit. Alternatively, the power supply failure signal may be modulated on one of the power supply lines. For example, the power supply and control unit may provide the functional unit with a voltage changing periodically at a given frequency between a first voltage value, e.g. 22V, and a second voltage value, e.g. 26V. When the power supply from the main power source fails, the power supply and control unit may communicate the power supply failure signal to the functional unit by continuously providing the functional unit with the same voltage value, e.g. 22V, instead of said periodically changing voltage.

More generally, the power supply failure signal may be modulated e.g. in amplitude and/or in frequency on a power signal on one of the power supply lines.

Preferably, the connection assembly also comprises one or more data communication lines. Indeed, typically the functional unit will measure, sense or receive data and these data may then be communicated to the power supply and control unit through the one or more data communication lines. Although the lines are being described as being part of a connection assembly, the lines may also be provided separately. In an embodiment, there may only be provided at least two power supply lines and one or more data communication lines, and the power supply and control unit may be configured to communicate the power supply failure signal to the functional unit wirelessly or via the power supply lines as previously described, or via one of the data communication lines. For example, the power supply failure signal may be transmitted via, and optionally modulated on, one of the data communication lines.

In the case where no data communication lines are provided, the functional unit may be configured to communicate data to the power supply and control unit wirelessly. Alternatively, the data may be modulated on the power supply lines. For example, the functional unit may provide the power supply and control unit with a voltage changing periodically at a given frequency between a first voltage value, e.g. 23V, and a second voltage value, e.g. 25V, in order to communicate a bit "1" to the power supply and control unit. Similarly, the functional unit may provide the power supply and control unit with a voltage changing periodically at a given frequency between a third voltage value, e.g. 22V, and a fourth voltage value, e.g. 26V, in order to communicate a bit "0" to the power supply and control unit.

More generally, the data may be modulated e.g. in amplitude and/or in frequency on a power signal on the power supply lines.

According to an embodiment, the power supply and control unit is configured such that it detects the power supply failure and communicates the power supply failure signal before the provision of power to the functional unit ends. Such detection can be done in a fast manner, for example within a time period of the order of microseconds. For example, the power supply and control unit may comprise a detection means configured to detect a power supply failure of the main power source by measuring a voltage or current signal coming from the main power source, e.g. an amplitude of such a signal, and by comparing said signal to a threshold value. For example, if the amplitude value is below a predetermined threshold it may be determined that the power provision fails and that a power supply failure signal has to be communicated to the functional unit. In this example, the main power source may be a DC power source, and the voltage a DC voltage. In a second example where the main power source is an AC power source, the power supply and control unit may comprise a detection means configured to detect a power supply failure of the main power source by measuring an AC voltage or current signal coming from the main power source, e.g. an amplitude of such an AC signal, and by detecting the zero-crossings of said AC signal. For example, if the frequency of the AC signal is 50 Hz said signal is expected to cross the zero value 100 times per second, or each 10 ms. If said zero-crossings are no longer detected, it may be determined that the power provision fails and that a power supply failure signal has to be communicated to the functional unit.

According to an embodiment, the power supply and control unit is configured to set a line voltage of the power failure communication line of the connection assembly at a different voltage level when it has been detected that the power supply from the main power source is interrupted. This line voltage then corresponds to the power failure signal. In the above-mentioned embodiment where there may only be provided at least two power supply lines and one or more data communication lines, the power supply and control unit may be configured to set a line voltage of one of the data communication lines at a different voltage level when it has been detected that the power supply from the main power source is interrupted. This line voltage then corresponds to the power failure signal.

According to an exemplary embodiment, the functional unit comprises communication circuitry, at least one antenna and a data storage means, or memory. In addition or alternatively, the functional unit may comprise at least one sensor, wherein preferably the at least one sensor comprises any one or more of the following sensors: a light sensor, an image sensor such as a camera, an audio sensor, an air quality sensor, a motion sensor, an environmental sensor sensing e.g. temperature, visibility, vibration, humidity, an electromagnetic sensor such as an IR sensor or an RF sensor, a thermal sensor, a dust sensor, a photosensitive sensor, a wind sensor, a smoke sensor, a radar or lidar sensor, an accelerometer, an astronomical clock, etc. The functional unit may also comprise a loudspeaker, a panic button, a screen, a charging device, base station circuitry, WiFi circuitry, GPS receiving means, and the like.

In a possible embodiment, the functional unit may be a control module with an integrated plug, e.g. a plug twist-lock control module, containing different control blocks and/or sensors, e.g. a light sensor for sensing the light level of ambient light to automatically control the light sources of the lighting equipment. The housing of the luminaire may then be provided with an electrical receptacle for receiving such a control module. Preferably, the receptacle and the control module fulfil the requirements of the ANSI C136.41-2013 standard and/or of the ANSI C136.10-2017 standard.

For certain functional units, the components thereof may be fed with a relative low voltage. Preferably, the power supply and control unit is configured to generate as the power signal a supply voltage below 50V, preferably below 26V, in particular below 15V, more preferably between 2 and 5V, for feeding the functional unit with said voltage. For example, the functional unit may be fed with a voltage of 3.3V.

In a preferred embodiment, the functional unit is configured to perform one or more actions upon receipt of the power supply failure signal. The one or more actions may include any one or more of the following: save and/or transmit data, optionally with a time stamp, set the functional unit in a power-off mode or a stand-by mode, transmit a signal indicating the power failure to a remote device, use an energy storage means of the functional unit. In preferred embodiments, said storage means is charged (e.g. permanently) by the power supply and control unit and the energy of the storage means is automatically used by the functional unit in case of power supply failure. In other embodiments, the energy storage means may be activated in order to use the energy thereof, and may correspond to an energy storage means that is only used in case of power failure.

According to an embodiment, the power supply and control unit is configured to use the power failure communication line, or one of the power supply lines as explained above, or one of the data communication lines as explained above, for indicating other information to the functional unit, such as identification data and/or the available quantity of energy from the energy storage capacity of the power supply and control unit and/or an indication that the power supply and control unit will stop the provision of power to the functional unit and/or the time period during which the functional unit will still be supplied with power by the power supply and control unit. In the case where the power supply failure signal is transmitted wirelessly, or via one of the power supply lines, or via one of the data communication lines, the other information may be transmitted via the same line as the power supply failure signal, or via a different line.

By providing identification data of the power supply and control unit, and/or the available quantity of energy from the energy storage capacity, to the functional unit, the functional unit may determine the time period during which power continues to be supplied to the functional unit after a power failure of the main source based on its energy consumption, so that it can schedule the actions to be performed upon receipt of the power supply failure signal accordingly.

Further, the or each functional unit may communicate its energy consumption of its stand-by mode. In a particular embodiment, the functional unit may have different types of stand-by modes, each being more or less energy consuming. In that case the functional unit may send the energy consumption of each stand-by mode to the power supply and control unit.

Additionally or alternatively, the functional unit may be configured to use the power failure communication line, or one of the power supply lines as explained above, or one of the data communication lines as explained above, for indicating other information to the power supply and control unit, such as identification data of the functional unit and/or the energy consumption of the functional unit.

By providing identification data of the functional unit, and/or the energy consumption of the functional unit, to the power supply and control unit, the power supply and control unit may determine the time period during which power continues to be supplied to the functional unit after a power failure of the main source based on the available quantity of energy from its energy storage capacity, and may optionally transmit said time period to the functional unit.

It is noted that the control and management of the actions to be performed may be done in the power supply and control unit and/or in the functional unit or units. When multiple functional units are provided with energy from the same energy storage capacity, it may be advantageous to control and manage the actions to be performed at least partly in the power supply and control unit.

In an exemplary embodiment, priority rules may be applied to the one or more actions to be performed upon receipt of the power supply failure signal. For example, the one or more actions to be performed may be further determined as a function of the quantity of energy still available in the energy storage capacity after reception of the power supply failure signal, and/or as a function of identification data such as the type of functional unit as mentioned below, and/or as a function of the energy consumption of said type of functional unit and/or as a function of the number of functional units. In the case where several functional units are present, some of them might be given priority, meaning the actions to be performed can vary from one functional unit to another. For example, some functional units might need to be directly switched off, while other functional units may use the available energy from the energy storage capacity in certain priority order.

As mentioned above the control and management of the actions to be performed may be done in the power supply and control unit and/or in the one or more functional units. The actions may depend on the number of functional units present in the luminaire. In other words, for a given functional unit and a given energy available, the actions to be performed could be different (for example different stand-by modes) if this functional unit is the only one or if there are several functional units (identical or different) since in the latter case the energy available will need to be shared. Moreover, depending on the priority given to this functional unit, compared to the other functional unit(s), different actions may be allowed.

The setting of the functional unit in a power-off mode may be dependent on the components in the functional unit. Therefore, it may be advantageous to indicate identification data such as the type of the functional unit to the power supply and control unit via the power failure communication line, or via one of the power supply lines as explained above, or via one of the data communication lines as explained above. For example, if the functional unit comprises communication circuitry it may be desirable to store recently received data and/or to inform remote devices of the power failure. Also relevant data may be sent to a remote device before the provision of power to the functional unit ends. In another example, where the functional unit comprises e.g. a video camera, it may be desirable to move certain parts of the functional unit into a shut-off position, e.g. to close a protection of the video camera.

The setting of the functional unit in a stand-by mode is advantageous in order to save energy. The functional unit may limit its actions to the ones that have a higher priority and/or that have lower energy consumption, and may already stop performing other actions that it usually performs during normal operation. The functional unit may also be enabled to keep on receiving data from a remote device, such as a server, and to answer prompts from said remote device.

The saving and/or transmitting of the data, optionally with a time stamp, is advantageous for preventing loss of the data in case of power supply failure of the main source. Also, the action of saving and/or transmitting the most relevant data may be given priority. Temporal information such as a time stamp may be advantageously communicated to the remote device or server in order to know precisely the time of the saving and/or transmitting of the data.

According to a possible embodiment, the functional unit comprises an energy storage means, and the functional unit is configured to perform said one or more actions when receiving the power supply failure signal, based on the quantity of energy that is still available in the energy storage means after reception of the power supply failure signal. In that manner, the functional unit is not interrupted during the saving of the relevant data, i.e., during the writing process in a data storage means, or memory, of the functional unit and/or during the transmitting of said relevant data. The energy storage means may be provided in a housing of the functional unit, in a housing of the power supply and control unit, or in a separate housing located between the power supply and control unit and the functional unit. In the two latter cases, if more than one functional unit are present, the energy storage means may be shared conveniently between the functional units. The priority rules may be further applied to the one or more actions to be performed upon receipt of the power supply failure signal as a function of the quantity of energy still available in the energy storage means after reception of the power supply failure signal. Also, for example if the functional unit of a given luminaire is provided with more communication capacity, e.g. long-range and/or high data rate communication capacity than the functional units of other luminaires, said functional unit will require more energy than the other functional units. Hence, a supplementary energy storage means may be included between said functional unit and the power supply and control unit, or said functional unit may comprise an energy storage means with higher capacity than that of the other functional units.

According to a preferred embodiment, the functional unit comprises an antenna arranged and configured for receiving and/or transmitting communication signals from/to a remote device, a light sensor configured for sensing a signal relating to ambient light levels, and communication circuitry configured for treating signals received by the antenna and the light sensor, and for treating signals to be transmitted by the antenna. Additionally or alternatively to the light sensor, the functional unit further comprises a localization unit such as a GPS receiver means. In yet other embodiments the light sensor and GPS receiver means may be omitted. The antenna may or may not be highly directional. Also omnidirectional antennas may be used. The antenna may be any type of antenna, such as an RF antenna, a Bluetooth antenna, a near field communication antenna, long range/short range communication antenna, etc. Also, there may be provided a plurality of antennas. In such an embodiment, the one or more actions performed by the functional unit may include e.g. any one or more of the following: save data received by the antenna or sensed by the light sensor, set the functional unit in a power-off mode or a stand-by mode, transmit a signal indicating the power failure to a remote device through the antenna, transmit relevant data to a remote device through the antenna, or use an energy storage means of the functional unit. When a localization unit is present, the localization of the luminaire can be communicated to other devices together with the power failure indication. For example, a central controller and/or adjacent luminaires can be informed about the location of the power failure.

In a preferred embodiment, the light source and the power supply and control unit are arranged in a housing, wherein preferably the housing is configured to provide an IP protection class of IP66, IP67 or IP68 in accordance with DIN EN 60529. Optionally also the functional unit is arranged in the housing. However, in other embodiments the functional unit may be arranged outside the housing. Typically, the housing corresponds with the housing of the luminaire head. This housing may then be fixed to a support pole. When the functional unit is arranged outside the housing of the luminaire head, said functional unit may be provided to the luminaire housing via a socket (also called electrical receptacle above), in particular when said functional unit is a control module. The socket may be a NEMA socket (notably as disclosed in the ANSI C136.10-2017 standard or the ANSI C136.41-2013 standard) or a Zhaga socket, or any other known type of socket.

In a preferred embodiment, the luminaire comprises a light source driving unit for driving the light source, and the power supply and control unit may then be preferably integrated in the light source driving unit. The light source may comprise a plurality of light emitting diodes, and the light source driving unit may then be configured to drive the light emitting diodes.

In a preferred embodiment, the luminaire comprises a programmable control means in communication with the functional unit and configured for controlling and optionally configuring the luminaire based on data from the functional unit. The programmable control means may be included in a separate controller or may be integrated with the above described light source driving unit. The data from the functional unit may comprise various types of data that may be further used for configuring and controlling the luminaire, such as sensed data from neighboring luminaires, configuration profiles received from a central controller, diagnostics data, real time dimming data, etc. The data may relate to data for controlling dimming means, data for controlling the measurements performed by sensors or other functional units, e.g. the at least one light sensor, etc. Preferably, the luminaire comprises a dimming means configured for dimming the light source, and the programmable control means is configured for controlling the dimming means based on received or stored data. The dimming means may be controlled e.g. in function of signals received from the antenna, in function of measured data, or in function of stored dimming profile data. More preferably, the dimming means is configured to use a dimming signal in accordance with standard protocols such as 0-10V, 1-10V or DALI.

Embodiments of the invention are particularly useful for outdoor luminaires. By outdoor luminaires, it is meant luminaires which are installed on roads, tunnels, industrial plants, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

BRIEF DESCRIPTION OF THE FIGURES

The accompanying drawings are used to illustrate presently preferred non-limiting exemplary embodiments of luminaires of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
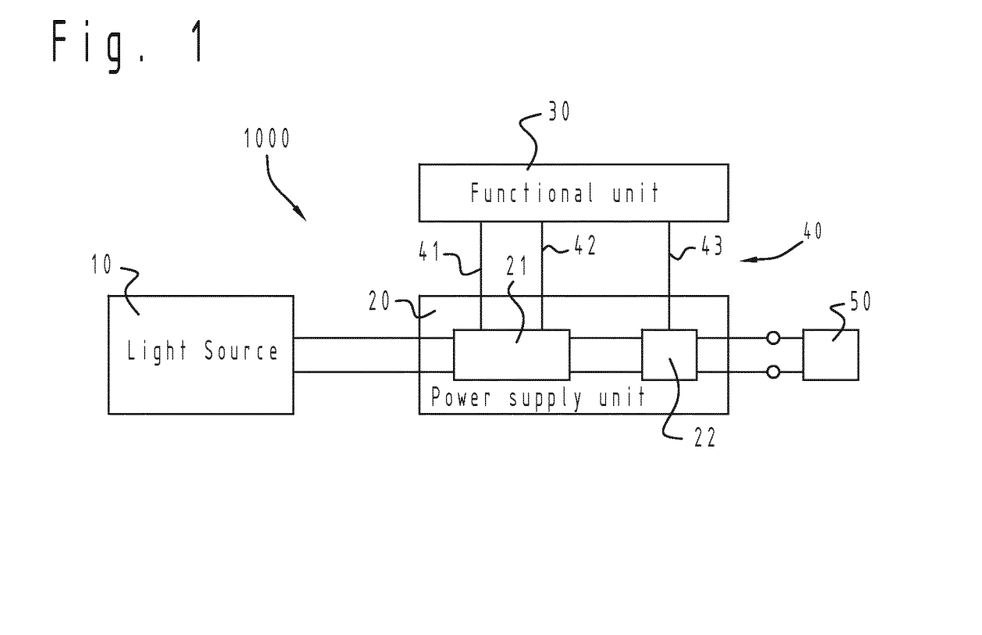
FIG. 1 is a schematic view of an exemplary embodiment of a luminaire of the invention.

FIG. 1 illustrates a luminaire 1000 with a light source 10. The luminaire 1000 may be a streetlight comprising a luminaire head and a support pole. However, the invention is applicable to any type of luminaires. The luminaire head may be connected to the luminaire pole in any manner known to the skilled person. In other embodiments, the luminaire head may be connected to a wall or a surface, e.g. for illuminating buildings or tunnels. The luminaire 1000 comprises a functional unit 30 and a power supply and control unit 20. The power supply and control unit 20 comprises conversion circuitry 21 configured for converting power from a main power source 50, typically the mains, into a power signal for powering the functional unit 30. For example, the conversion circuitry 21 of the power supply and control unit 20 may be configured to generate as the power signal a supply voltage below 50V, preferably below 26V, in particular below 15V, more preferably between 2 and 5V, for feeding the functional unit 30 with said voltage. The power supply and control unit 20 comprises detection means, e.g. detection circuitry 22 configured to generate a power supply failure signal when the power supply from the main power source 50 fails and to communicate the power supply failure signal to the functional unit 30.

The power supply and control unit 20 may be provided with an energy storage capacity (not shown) which is such that power is provided to the functional unit 30 or to the functional unit 30 and the power supply and control unit 20 during a predetermined period of time after the power supply from the main power source 50 has stopped. The power conversion circuitry (not shown) of the power supply and control unit 20 may comprise capacitors and/or inductors and will automatically result in a delay, and hence in a gradual fading away of the provision of power to the functional unit 30. However, the time period may be extended by adding an energy storage capacity (not shown). The time period may be of the order of milliseconds, typically at least 10 ms, preferably of the order of seconds, typically at least 10 s. More preferably, it will be at least 30 s, even more preferably at least 60 s, typically at least 300 s.

The power supply and control unit 20 is connected to the functional unit 30 through a connection assembly 40 comprising at least two power supply lines 41, 42 and a line 43 for transferring the power supply failure signal. In an alternative embodiment, there may only be provided at least two power supply lines 41, 42, and the power supply and control unit 20 may be configured to communicate the power supply failure signal wirelessly to the functional unit 30. Alternatively, the power supply failure signal may be modulated on one of the power supply lines 41, 42. For example, the power supply and control unit 20 may provide the functional unit 30 with a voltage changing periodically at a given frequency between a first voltage value, e.g. 22V, and a second voltage value, e.g. 26V. When the power supply from the main power source 50 fails, the power supply and control unit 20 may communicate the power supply failure signal to the functional unit 30 by continuously providing the functional unit 30 with the same voltage value, e.g. 22V, instead of said periodically changing voltage. More generally, the power supply failure signal may be modulated e.g. in amplitude and/or in frequency on one of the power supply lines 41, 42.

The power supply and control unit 20, and in particular the detection means 22, is configured such that it detects the power failure and communicates the power supply failure signal before the provision of power to the functional unit 30 ends, as will be illustrated in more detail below, when referring to FIG. 4.

Preferably, the functional unit 30 is configured to perform one or more actions upon receipt of the power supply failure signal. The one or more actions may include any one of the following: save and/or transmit data, optionally with a time stamp, set the functional unit 30 in a power-off mode or a stand-by mode, transmit a signal indicating the power failure to a remote device (not shown). The remote device may be e.g. a controller such as a central controller or a controller in a neighbouring luminaire, or a remote server. Priority rules may be applied to the actions to be performed upon receipt of the power supply failure signal. Also, the one or more actions to be performed and/or the priority rules may be set up as a function of the quantity of energy still available in the energy storage capacity after reception of the power supply failure signal, and/or as a function of the type of functional unit, and/or as a function of the energy consumption of said type of functional unit and/or as a function of the number of functional units (see FIG. 5).

Preferably, the functional unit 30 comprises an energy storage means (not shown), and the functional unit 30 is configured to perform said one or more actions when receiving the power supply failure signal, based on the quantity of energy that is still available in the energy storage means after reception of the power supply failure signal. In other embodiments, the energy storage means may be provided to the power supply and control unit 20. In yet other embodiments, the energy storage means may be provided between the power supply and control unit 20 and the functional unit 30. If more than one functional unit 30 are present, the energy storage means may be shared between the functional units. The priority rules may be further applied to the one or more actions to be performed upon receipt of the power supply failure signal as a function of the quantity of energy still available in the energy storage means after reception of the power supply failure signal. In the case where several functional units 30, 30' are present, such as in the embodiment illustrated in FIG. 5, some of them might be given priority, meaning that the actions to be performed can vary from one functional unit 30, 30' to another 30, 30'. For example, some functional units might need to be directly switched off, while other functional units may use the energy from the energy storage capacity and/or from the energy storage means in certain priority order.

Figure 5:
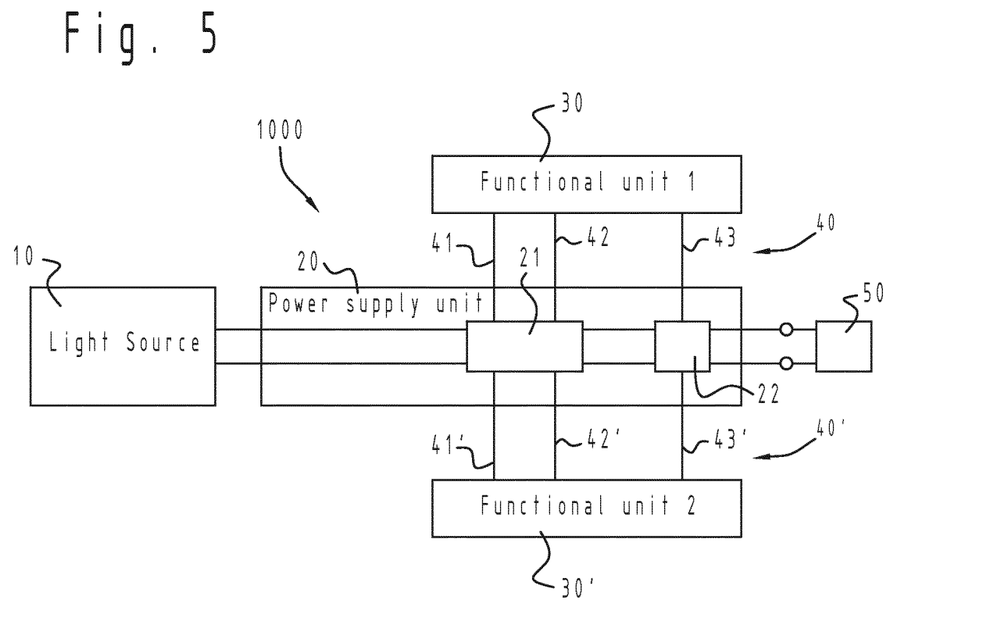
FIG. 5 is a schematic view of another exemplary embodiment of a luminaire of the invention.

In the embodiment of FIG. 5, two functional units 30, 30' are present. The power supply and control unit 20 is connected to the first functional unit 30 through a first connection assembly 40 comprising at least two power supply lines 41, 42 and a power failure communication line 43 for transferring the power supply failure signal. Similarly, the power supply and control unit 20 is connected to the second functional unit 30' through a second connection assembly 40' comprising at least two power supply lines 41', 42' and a power failure communication line 43' for transferring the power supply failure signal. In an alternative embodiment, there may only be provided at least two power supply lines 41, 42, and at least two power supply lines 41', 42', and the power supply and control unit 20 may be configured to communicate the power supply failure signal wirelessly to the first functional unit 30 and/or to the second functional unit 30'. Alternatively or additionally, the power supply failure signal may be modulated on one of the power supply lines 41, 42 and/or on one of the power supply lines 41', 42'. Although not shown in FIG. 5, the first functional unit 30 may directly communicate with the second functional unit 30' without transiting by the power supply and control unit 20.

In a preferred embodiment, the light source 10 and the power supply and control unit 20 are arranged in a housing (not shown), wherein preferably the housing is configured to provide an IP protection class of IP66, IP67 or IP68 in accordance with DIN EN 60529. Optionally, the functional unit 30 may also be arranged in the housing. However, in other embodiments the functional unit 30 may be arranged outside the housing. When the functional unit 30 is arranged outside the housing of the luminaire head, said functional unit 30 may be provided to the luminaire housing via a socket. The socket may be a NEMA socket (notably as disclosed in the ANSI C136.10-2017 standard or the ANSI C136.41-2013 standard) or a Zhaga socket, in particular when said functional unit 30 is a control module.

In a possible embodiment, the functional unit 30 may comprise communication circuitry, at least one antenna and a data storage means, or memory. The antenna may be configured for receiving and/or emitting signals. Also, more than one antenna may be provided. Examples of antennas that may be provided are: an RF antenna, a Bluetooth antenna, a NFC antenna, an antenna suitable for the LoRa communication protocol, etc. In addition or alternatively the functional unit 30 may comprise at least one sensor, wherein preferably the at least one sensor comprises any one or more of the following sensors: a light sensor, an image sensor such as a camera, an audio sensor, an air quality sensor, a motion sensor, an environmental sensor sensing e.g. temperature, visibility, vibration, humidity, an electromagnetic sensor such as an IR sensor or an RF sensor, a thermal sensor, a dust sensor, a photosensitive sensor, a wind sensor, a smoke sensor, a radar or lidar sensor, an accelerometer, an astronomical clock, etc. The functional unit 30 may also be a loudspeaker, a panic button, a screen, a charging device, base station circuitry, WiFi circuitry, GPS receiving means, and the like. The functional unit 30 may be positioned entirely within a housing of a luminaire head of the luminaire, together with the light source 10. Alternatively, the functional unit 30 may be positioned partially or fully outside of the housing of the luminaire head. For example, the functional unit 30 may comprise a camera attached to a support pole of the luminaire at a distance of the housing of the luminaire head.

In a preferred embodiment, the functional unit 30 comprises an antenna arranged and configured for receiving and/or transmitting communication signals from/to a remote device, a light sensor configured for sensing a signal relating to ambient light levels, and communication circuitry configured for treating signals received by the antenna and the light sensor, and for treating signals to be transmitted by the antenna. Additionally or alternatively to the light sensor, the functional unit 30 may comprise a localization unit such as a GPS receiver means.

Figure 2:
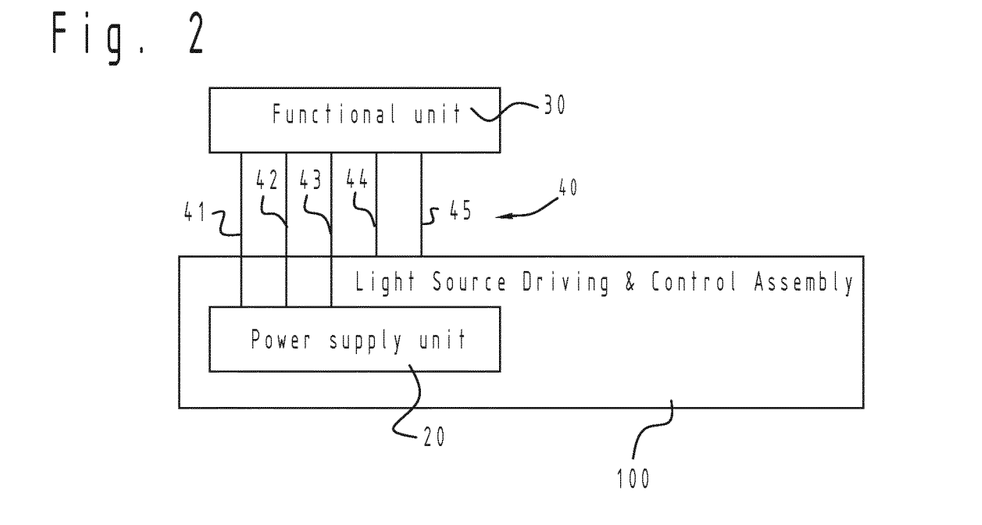
FIG. 2 is a schematic view of an exemplary embodiment of a light source driving and control assembly connected to a functional unit.
Figure 3:
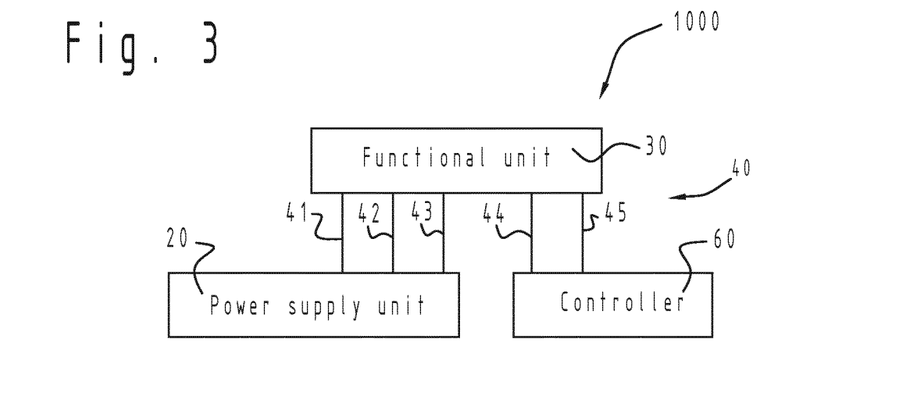
FIG. 3 is a schematic view of an exemplary embodiment of a functional unit connected to a power supply unit and a controller.

In a preferred embodiment, the connection assembly 40 further comprises at least two data communication lines 44, 45, as illustrated in the variants of FIGS. 2 and 3. The functional unit 30 may measure, sense or receive data and these data may then be communicated to the power supply and control unit 20 through the at least two data communication lines 44, 45. Although the data communication lines 44, 45 are being described in FIGS. 2 and 3 as being part of a connection assembly 40, the data communication lines 44, 45 may also be provided separately.

In the embodiment of FIG. 2, the luminaire comprises a light source driving and control assembly 100 for driving the light source and for controlling and optionally configuring the luminaire 1000. In such an embodiment, the power supply and control unit 20 may be integrated in the light source driving and control assembly 100. The light source driving and control assembly 100 may further comprise a programmable control means in communication with the functional unit 30, preferably through the data communication lines 44, 45, and configured for controlling and optionally configuring the luminaire based on data from the functional unit 30. The programmable control means may be integrated with the above described light source driving unit, may be included in a separate controller as illustrated in FIG. 3. Preferably, the light source driving and control assembly 100 comprises a dimming means configured for dimming the light source 10. The programmable control means is then preferably configured for controlling the dimming means. For example, the dimming means may be controlled in function of data received from a light sensor and/or based on data received from other luminaires or from other devices. Such data may be received via the data communication lines 44, 45.

In the embodiment of FIG. 3 there is provided a separate power supply and control unit 20 and a controller 60. The controller 60 may comprise a programmable control means in communication with the functional unit 30, preferably through data communication lines 44, 45, and configured for controlling and optionally configuring the luminaire based on data from the functional unit 30. The power supply and control unit 20 may be an integral part of a light source driver.

In other embodiments than those illustrated in FIGS. 2 and 3, there may only be provided at least two power supply lines 41, 42. The functional unit 30 may be configured to communicate the data wirelessly to the power supply and control unit 20. Alternatively, the data may be modulated on the power supply lines 41, 42. For example, the functional unit 30 may provide the power supply and control unit 20 with a voltage changing periodically at a given frequency between a first voltage value, e.g. 23V, and a second voltage value, e.g. 25V, in order to communicate a bit "1" to the power supply and control unit. Similarly, the functional unit 30 may provide the power supply and control unit 20 with a voltage changing periodically at a given frequency between a third voltage value, e.g. 22V, and a fourth voltage value, e.g. 26V, in order to communicate a bit "0" to the power supply and control unit 20. Hence, the data may be modulated both in amplitude and in frequency on the power supply lines 41, 42.

Preferably, the light source 10 comprises a plurality of light emitting diodes (LEDs). In the embodiment of FIG. 2 the light source driving and control assembly 100 will then comprise LED driver circuitry. In the embodiment of FIG. 3, the light source driver will then comprise LED driver circuitry.

It is noted that the connection assembly 40 between the functional unit 30 and the light source driving and control assembly 100 may comprise more or less than five lines, e.g. four, six, seven or more lines depending on the data to be transferred. Also, instead of 2 power supply lines 41, 42, there may be provided more than two power supply lines.

Figure 4:
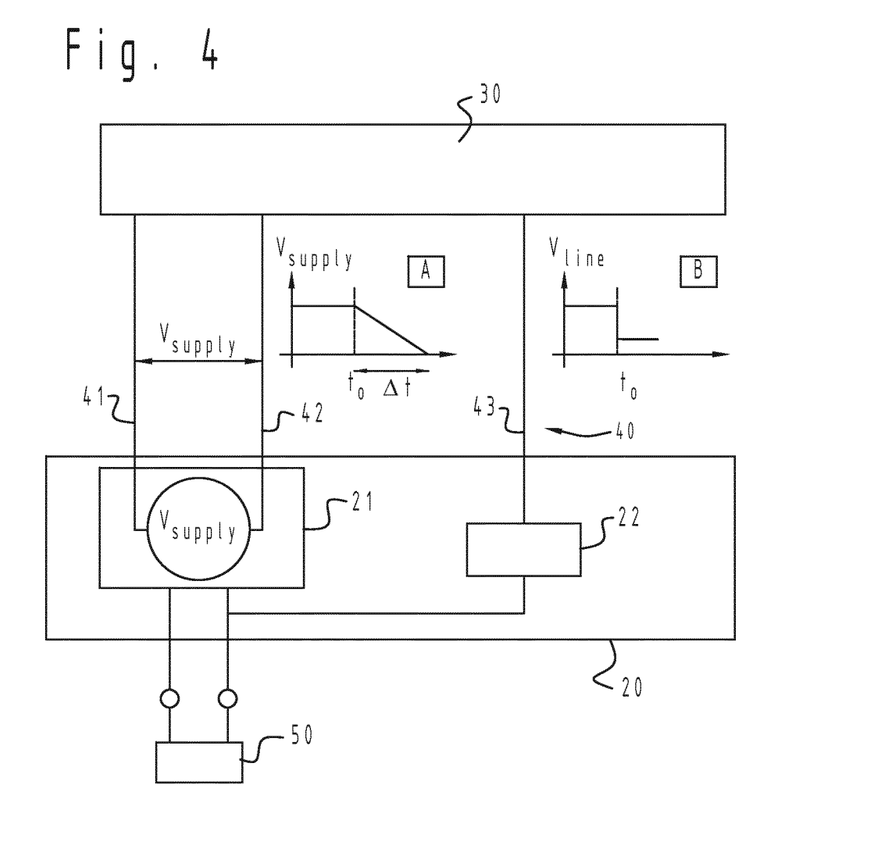
FIG. 4 illustrates schematically the voltage levels on the lines in the event of a power failure situation, in accordance with an exemplary embodiment.

FIG. 4 illustrates in more details the operation of the power supply and control unit 20. The power supply and control unit 20 is configured to receive power from a main power source 50 (typically the mains) and to provide a suitable power supply voltage $V_{supply}$ to the functional unit 30. The power supply and control unit 20 comprises a detection means 22 configured to generate a power supply failure signal when the power supplied by the main power source 50 fails, and to communicate the detection through line 43 of the connection assembly 40. In a first example where the main power source 50 is a DC power source 50, the detection means 22 may be configured to detect a power supply failure of the main power source 50 by measuring a DC voltage or current signal coming from the main power source 50, e.g. an amplitude of such a signal, and by comparing said DC signal to a threshold value. For example, if the amplitude value is below a predetermined threshold it may be determined that the power provision fails and that a power supply failure signal has to be communicated to the functional unit 30. In a second example where the main power source 50 is an AC power source 50, the detection means 22 may be configured to detect a power supply failure of the main power source 50 by measuring an AC voltage or current signal coming from the main power source 50, e.g. an amplitude of such an AC signal, and by detecting the zero-crossings of said AC signal. For example, if the frequency of the AC signal is 50 Hz said signal is expected to cross the zero value 100 times per second, or each 10 ms. If said zero-crossings are no longer detected, it may be determined that the power provision fails and that a power supply failure signal has to be communicated to the functional unit 30. For example, this can be done by changing the voltage level on a dedicated power failure communication line 43 of the connection assembly 40. In that manner, the functional unit 30 can be informed in a fast manner about a power failure, and can take appropriate action(s) such as storing and/or sending critical data, setting the functional unit 30 in a power-off mode or a stand-by mode, sending a signal to a remote device, use a power storage means of the functional unit, etc., before the power provision to the functional unit 30 is stopped completely. This is schematically illustrated in FIG. 4. When the main power source 50 fails to provide power to the power supply and control unit 20 at a point in time t0, the supply voltage $V_{supply}$ provided to the functional unit 30 will slowly drop as illustrated in diagram A of FIG. 4. This can be achieved by means of capacitive and/or inductive elements inside electrical circuitry. The detection means 22 is configured to detect a power failure and to generate a power supply failure signal on the power failure communication line 43. This may be done e.g. by changing the voltage level on the power failure communication line 43. This line voltage $V_{line}$ then corresponds to the power failure signal.

In another embodiment than that illustrated in FIG. 4, there may only be provided at least two power supply lines 41, 42 and one or more data communication lines, such as the data communication lines 44, 45 of FIGS. 2 and 3. The power supply and control unit 20 may be configured to set a line voltage of one of the data communication lines 44, 45 of FIGS. 2 and 3 at a different voltage level when it has been detected that the power supply from the main power source 50 is interrupted. This line voltage then corresponds to the power failure signal. As illustrated in diagram B of FIG. 4, such a signal can be transferred in a very fast manner to the functional unit 30, so that the functional unit 30 can take appropriate action within a delay time $\Delta t$ before the power supply is completely finished, see diagram A of FIG. 4.

Whilst the principles of the invention have been set out above in connection with specific embodiments, it is to be understood that this description is merely made by way of example and not as a limitation of the scope of protection which is determined by the appended claims.

The invention claimed is:

1. A luminaire with a light source, said luminaire comprising:
   a functional unit; and
   a power supply and control unit configured for converting power from a main power source into a power signal for powering the functional unit,
   wherein the power supply and control unit is configured to generate a power supply failure signal when the power supply from the main power source fails and to communicate the power supply failure signal to the functional unit, and
   wherein the functional unit is configured to perform one or more actions upon receipt of the power supply failure signal, and wherein the one or more actions comprise: saving data or selecting between setting the functional unit in a power-off mode or a stand-by mode.

2. The luminaire according to claim 1, wherein the power supply and control unit is configured such that it detects the power supply failure and communicates the power supply failure signal before the provision of power to the functional unit ends.

3. The luminaire according to claim 1, wherein the power supply and control unit is provided with an energy storage capacity which is such that power is provided during a predetermined period of time after the power supply from the main power source has stopped.

4. The luminaire according to claim 1, wherein the one or more actions further comprise: transmitting data, transmitting a signal indicating the power failure to a remote device, or using an energy storage means of the functional unit.

5. The luminaire according to claim 1, wherein priority rules are applied to the one or more actions, and wherein preferably the priority rules are at least one of:
   based on a type of functional unit;
   based on a quantity of energy available upon reception of the power supply failure signal;
   a function of an energy consumption of the functional unit; and
   based on the number of functional units of the luminaire.

6. The luminaire according to claim 1, wherein the power supply and control unit is connected to the functional unit through at least two power supply lines, and wherein preferably the power supply and control unit is configured to transfer the power supply failure signal through at least one of the at least two power supply lines.

7. The luminaire according to claim 1, wherein the power supply and control unit is connected to the functional unit through a power failure communication line for transferring the power supply failure signal, wherein preferably the power supply and control unit is configured to use the power failure communication line for indicating other information to the functional unit, such as at least one of:
   identification data of the power supply and control unit;
   a quantity of energy available upon reception of the power supply failure signal; and
   a time period during which the functional unit will still be powered by the power supply and control unit.

8. The luminaire of claim 7, wherein the functional unit is configured to use the power failure communication line for indicating other information to the power supply and control unit, such as identification data of the functional unit.

9. The luminaire according to claim 1, wherein the power supply and control unit is connected to the functional unit through at least one data communication line, and wherein preferably the power supply and control unit is configured to transfer the power supply failure signal through one of the at least one data communication lines.

10. The luminaire according to claim 7, wherein the power supply and control unit is configured to set a line voltage of the power failure communication line or of the at least one data communication line at a different voltage level when it has been detected that the power supply from the main power source is interrupted, and wherein this line voltage corresponds to the power failure signal.

11. The luminaire according to claim 1, wherein the power supply and control unit is configured to communicate the power supply failure signal wirelessly to the functional unit.

12. The luminaire according to claim 1, wherein:
   the functional unit comprises: communication circuitry, at least one antenna, and a data storage means or memory; or
   the functional unit comprises at least one sensor, wherein preferably the at least one sensor comprises at least one of the following sensors: a light sensor, an image sensor such as a camera, an audio sensor, an air quality sensor, a motion sensor, an environmental sensor, an antenna arranged and configured for receiving or transmitting communication signals from/to a remote device, a light sensor configured for sensing a signal relating to ambient light levels, or communication circuitry configured for treating signals received by the antenna and the light sensor and for treating signals to be transmitted by the antenna.

13. The luminaire according to claim 1, wherein:
   the power supply and control unit is configured to generate as the power signal a supply voltage below 50V, preferably below 26V, in particular below 15V, more preferably between 2 and 5V, for feeding the functional unit with the voltage; or
   the light source and the power supply and control unit are arranged in a housing, wherein preferably the housing is configured to provide an IP protection class of IP66, IP67, or IP68 in accordance with DIN EN 60529, and wherein preferably the functional unit is arranged in the housing.

14. The luminaire according to claim 1, further comprising a light source driving unit for driving the light source, wherein the power supply and control unit is integrated in the light source driving unit.

15. The luminaire according to claim 1, further comprising a programmable control means in communication with the functional unit and configured for controlling and optionally configuring the luminaire based on data from the functional unit,
wherein preferably the programmable control means is coupled with or integrated to the light source driving unit.

16. The luminaire according to claim 1, wherein the functional unit comprises a localization unit such as a GPS receiver means.

17. The luminaire according to claim 1, wherein the functional unit comprises an energy storage means,
wherein preferably the functional unit is configured to perform the one or more actions based on a quantity of energy that is still available in the energy storage means after reception of the power supply failure signal, or wherein the functional unit is configured to switch to the energy storage means when receiving the power supply failure signal.

18. The luminaire according to claim 1, wherein the power supply and control unit comprises a detection means configured to detect a power supply failure of the main power source by:
measuring a voltage or current signal, e.g. an amplitude of such a signal; and
comparing the signal to a threshold value or detecting zero-crossings of the signal.

19. A luminaire with a light source, said luminaire comprising:
a functional unit; and
a power supply and control unit configured for converting power from a main power source into a power signal for powering the functional unit,
wherein the power supply and control unit is configured to generate a power supply failure signal when the power supply from the main power source fails and to communicate the power supply failure signal to the functional unit,
wherein the functional unit is configured to perform one or more actions upon receipt of the power supply failure signal, and
wherein the one or more actions are performed according to a set of priority rules.

20. A luminaire with a light source, said luminaire comprising:
a functional unit; and
a power supply and control unit configured for converting power from a main power source into a power signal for powering the functional unit,
wherein the power supply and control unit is configured to generate a power supply failure signal when the power supply from the main power source fails and to communicate the power supply failure signal to the functional unit,
wherein the power supply and control unit is connected to the functional unit through a power failure communication line for transferring the power supply failure signal, and
wherein:
the functional unit is configured to use the power failure communication line for indicating other information to the power supply and control unit, such as identification data of the functional unit and/or
the power supply and control unit is configured to use the power failure communication line for indicating other information to the functional unit, such as at least one of:
identification data of the power supply and control unit;
a quantity of energy available upon reception of the power supply failure signal; and
a time period during which the functional unit will still be powered by the power supply and control unit.

* * * * *